(12) United States Patent
Krejci

(10) Patent No.: US 6,381,823 B1
(45) Date of Patent: May 7, 2002

(54) METHOD OF FABRICATING A GAS TANK

(76) Inventor: Kyle P. Krejci, 120 W. Shannon St., Gilbert, AZ (US) 85233

( * ) Notice: Subject to any disclaimer, the term of this patent is extended or adjusted under 35 U.S.C. 154(b) by 0 days.

(21) Appl. No.: 09/494,479

(22) Filed: Jan. 31, 2000

Related U.S. Application Data

(63) Continuation-in-part of application No. 29/113,069, filed on Oct. 29, 1999, now Pat. No. Des. 432,486.

(51) Int. Cl.[7] .............................. F17C 1/00; B23P 17/00
(52) U.S. Cl. .......................... 29/416; 29/463; 220/562; 220/564; 280/835
(58) Field of Search .............................. 29/463, 407.08, 29/416; 220/562, 612, 678, 905, 564; 280/830, 835

(56) References Cited

U.S. PATENT DOCUMENTS

| | | | |
|---|---|---|---|
| 3,734,387 A | * | 5/1973 | Sannipoli |
| 4,364,161 A | * | 12/1982 | Stading ........................ 29/407 |
| 4,401,309 A | * | 8/1983 | Matsuzaki et al. |
| 4,461,489 A | * | 7/1984 | Tsukiji et al. |
| 4,469,190 A | * | 9/1984 | Yamaguchi |
| 4,492,250 A | * | 1/1985 | Ohmori et al. |
| 4,799,569 A | * | 1/1989 | Hattori et al. |
| 5,542,706 A | * | 8/1996 | Kubly ......................... 280/835 |
| 5,634,706 A | * | 6/1997 | Barry |
| 5,944,216 A | * | 8/1999 | Inaoka et al. ................ 220/612 |
| 6,069,337 A | * | 5/2000 | Takase et al. |
| D432,486 S | * | 10/2000 | Krejci ........................ D12/218 |

FOREIGN PATENT DOCUMENTS

| | | | | |
|---|---|---|---|---|
| JP | 59-27738 | * | 2/1984 | |
| JP | 04-254276 | * | 9/1992 | ................ 280/835 |
| JP | 04-271983 | * | 9/1992 | ................ 280/835 |
| JP | 06-047572 | * | 2/1994 | |
| JP | 10-076985 | * | 3/1998 | |
| JP | 10-181658 | * | 7/1998 | |
| JP | 10-316072 | * | 12/1998 | |

* cited by examiner

*Primary Examiner*—S. Thomas Hughes
*Assistant Examiner*—Eric Compton
(74) *Attorney, Agent, or Firm*—H. Gordon Shields

(57) ABSTRACT

A method of forming a gas tank includes forming two halves and welding the halves together. Two types of welds are used, tack welds for holding the complete welds after different steps have been taken to the tack weld elements or parts, and stitch welds to complete the welding of the two halves. Reinforcement is added where necessary. Double tanks, for both gasoline and oil, are also fabricated of essentially the same method steps.

5 Claims, 4 Drawing Sheets

METHOD OF FABRICATING A GAS TANK

CROSS REFERENCE TO RELATED APPLICATIONS

This is a continuation-in-part of Ser. No. 29/113,069, filed Oct. 29, 1999, now U.S. Pat. No. Des. 432,486, issued Oct. 24, 2000.

BACKGROUND OF THE INVENTION

1. Field of the Invention

This invention relates to gas tanks and, more particularly, to the fabrication of a gas tank for a motorcycles.

2. Description of the Prior Art

There are primarily two types of gas tanks for motorcycles, one fabricated from aluminum and a second fabricated from steel. The gas tanks, regardless of what material they are made out of, are typically formed or stamped and then welded together. Different approaches are used, depending on a particular motorcycle chassis that the tank will be fitted to. The tanks include a tunnel area which receives part of the motorcycle chassis. This tunnel area may present structural and fabrication problems. Prior art gas tanks steel may be susceptible to vibration and cracking, which results in gasoline leaking from the tank, and this may result in fire problems.

A second problem is simply the structural strength of the tank in situations of accidents whereby the tanks may break, with the resulting loss of gasoline and the potential for fire.

Welding techniques of the prior art typically use continuous beads. This results in heat problems and ultimately results in structural problems in the tanks.

The method of the present invention overcomes the problems of prior art gas tanks. Heavier gauge steel is used in the present method, and the specific steps outlined provide a gas tank for a motorcycle which is strong and which may be adapted to different types of motorcycle chassis.

SUMMARY OF THE INVENTION

The invention described and claimed herein comprises a method for making a gas tank for a motorcycle which includes a series of steps beginning with the forming of two halves by hydro forming techniques. The resulting gas tanks are structurally strong and may be formed to be mated to two different types of motorcycle chassis.

Among the objects of the present invention are the following:

To provide new and useful method of making a gas tank;

To provide a new and useful method of making a gas tank for a motorcycle;

To provide new and useful method of making a double tank unit including a gas tank and an oil tank; and To provide new and useful method of forming and welding a motorcycle gas tank.

DESCRIPTION OF THE PREFERRED EMBODIMENT

The gas tanks made by the method of the present invention are made of sixteen gauge cold rolled steel. This is relatively heavy steel, but it is preferred because of its strength. Even though gas tanks made of sixteen gauge steel are heavier than gas tanks made out of either aluminum or eighteen gauge steel, the strength factor, along with the attendant safety factor, more than overcome the weight disadvantage.

The following table 1 outlines the steps taken in manufacturing a gas tank by the present method.

TABLE 1

Figure 1:
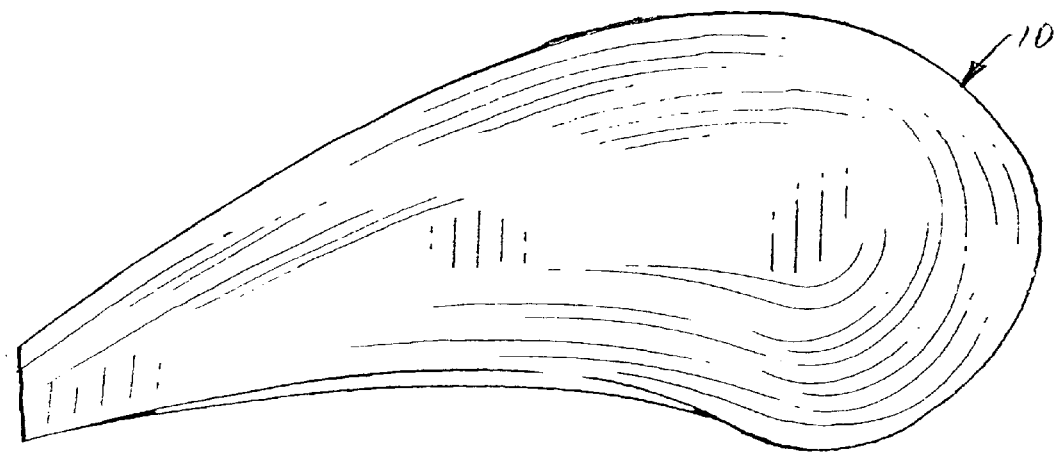
FIG. 1 is a side view of the right half of the gas tank made by the present invention.
Figure 2:
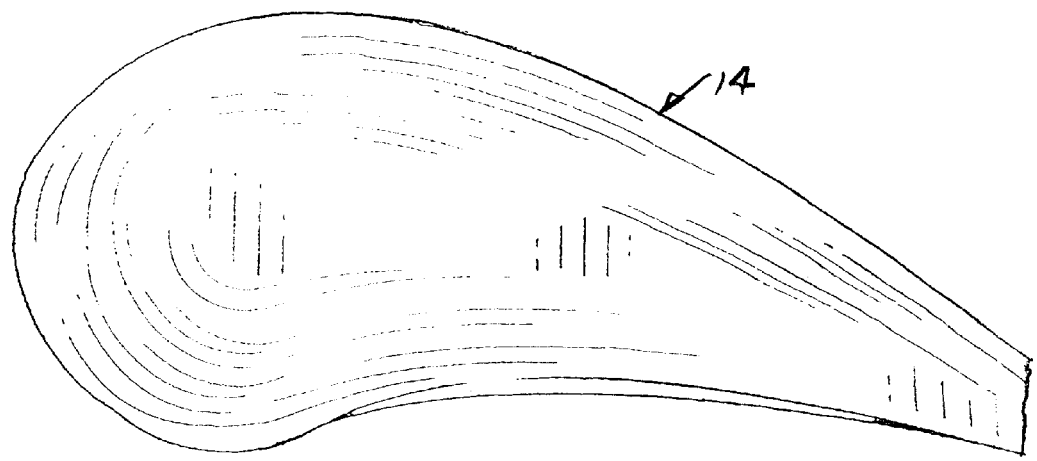
FIG. 2 is a side view of the left half of the gas tank made by the present method.

1. Stamp both sides
2. Trim excess material from sides
3. Tack weld side halves
4. Cut out bottom tunnel area
5. Add sheet metal panel to inside of tank top portion
6. Weld sheet metal panel to tank
7. Form tunnel
8. Weld tunnel to tank halves
9. Form bottom rear end piece
10. Weld bottom rear end piece to tank halves
11. Weld tank
12. Form mounting brackets
13. Weld mounting brackets
14. Drill mounting brackets
15. Drill crossover holes and petcock hole
16. Position tapped mounting bungs, crossover bungs, and petcock bung
17. Tack weld and weld mounting bungs, crossover bungs, and petcock bung
18. Turn unit over
19. Drill gas cap fitting
20. Clean out unit through gas cap fitting hole
21. Position gas cap fitting
22. Tack weld and weld gas cap fitting
23. Position seat pocket plate
24. Tack weld and weld seat pocket plate
25. Grind welds
26. Pressure test It will be noted that the gas tanks are formed in halves, and the halves are longitudinal halves. That is, two longitudinally extending halves are formed of the cold rolled steel. The forming is preferably done by stamping both halves, or sides, by hydroforming. Preferably, sixteen gauge cold rolled steel is used in the fabrication of a gas tank. A right side half 10 is shown in FIG. 1 and a left side half 14 is shown in FIG. 2.

Figure 3:
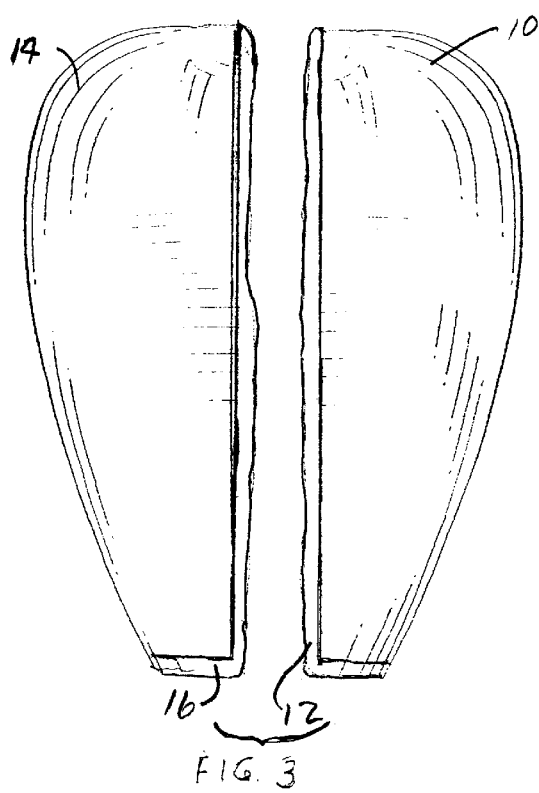
FIG. 3 is a top view of the two halves showing excess material.

The second step is trimming the excess material from the formed sides. The two halves are then tack welded. TIG (Tungsten Inert Gas) welding is preferably used. FIG. 3 shows excess material 12 and 16 on the halves 10 and 14, respectively.

Figure 4:
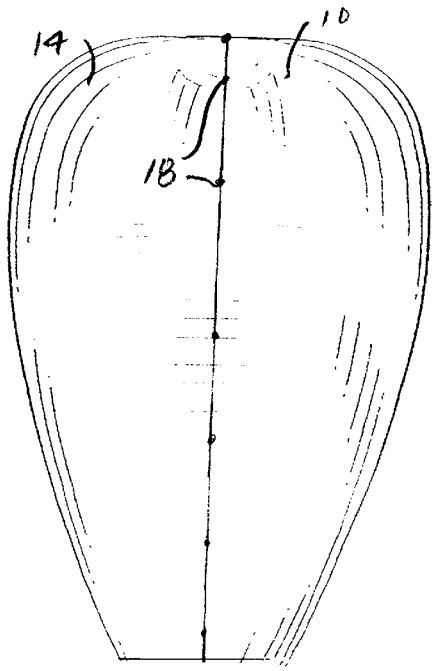
FIG. 4 is a top view of the two halves after tack welding.

FIG. 4 shows the two trimmed halves 10 and 14 tack welded together by tack welds 18.

Figure 5:
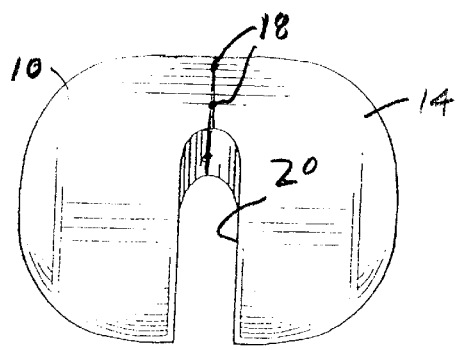
FIG. 5 is a front view of the two tack welded halves with the tunnel area cut out.
Figure 6:
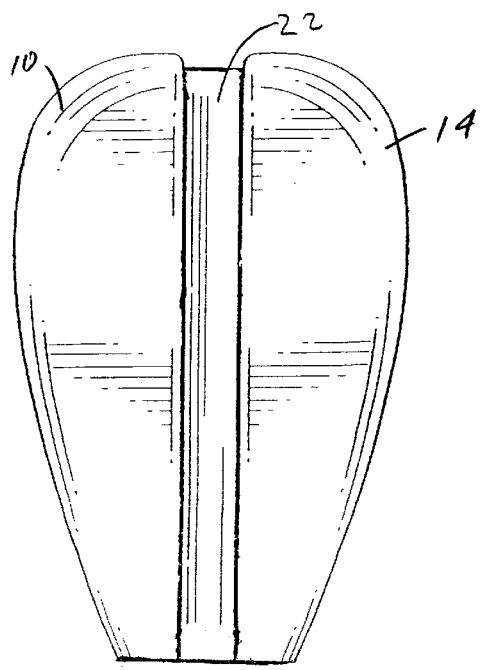
FIG. 6 is a bottom plan view showing a plate disposed against the top or upper portion of the tank.

The tack welded tank is then inverted and a bottom tunnel area 30 is cut from the two tack welded halves. FIG. 5 is a front view of the two halves 10 and 14 with the tunnel area 20 cut from the two halves. With the tunnel area removed from the two halves, a sheet metal panel 22 is added to the inside of the tank top portion. This reinforcing panel 22 is then welded to both sides of the tank. The panel 22 is shown in FIG. 6, which is a bottom plan view of the two tank halves 10 and 14.

Figure 7:
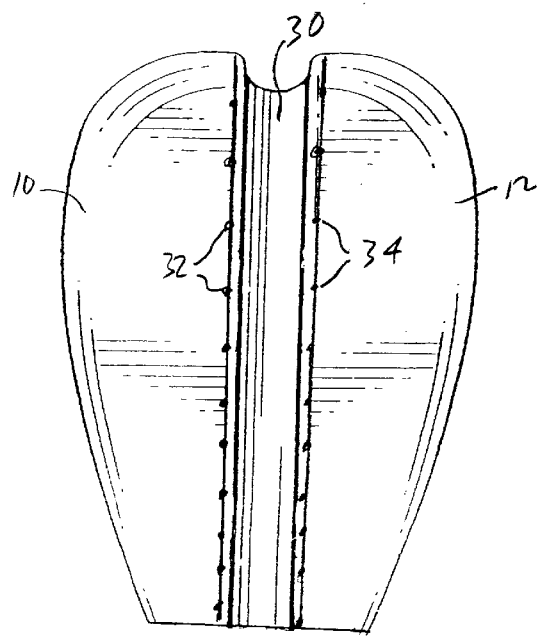
FIG. 7 is a bottom plan view showing a tunnel piece welded in place.

Panels are then added to form the tunnel area and the panels are first tack welded and then welded in place. FIG. 7 shows a formed tunnel 30 secured to the halves 10 and 14 by stitch welds 32 and 34, respectively.

Figure 8:
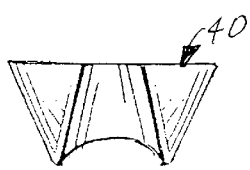
FIG. 8 is a plan view of a rear end piece.

The bottom rear of the tank is then formed and tack welded to the two halves. The bottom rear end piece is then welded to the tank. A bottom rear end piece 40 is shown in FIG. 8, which is a bottom plan view of the end piece 40.

Following the welding step of the rear end piece to the tank halves, the tank halves are then welded together in a permanent weld. Stitch welding is used to make certain that the metal does not overheat in the area of the welds. The stitches are overrun to make certain that there are no voids in the weld beads. The overheating of the metal will result in brittleness, which is highly undesirable. Rather, stitch welding techniques are used so that the tank portions have a chance to cool between stitches. This prevents the overheating of the tank and thus avoids the brittleness problem.

Mounting brackets are formed next and then the mounting brackets are welded to the bottom of the tank at the tunnel area. The mounting bracket holes are then drilled, and at the same time the crossover holes and a petcock hole are also drilled. Tapped mounting bungs, crossover bungs, and a petcock bung are then positioned in the drilled holes and are tack welded in place. After the tack welding step, the mounting bungs, crossover bungs, and the petcock bung are finish welded.

Figure 9:
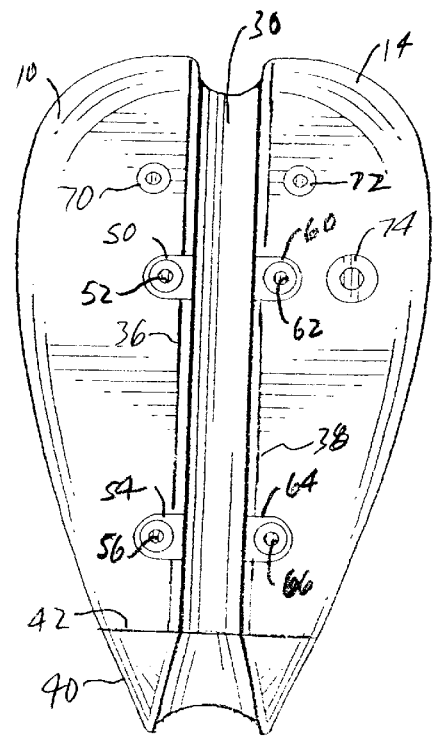
FIG. 9 is a bottom plan view sequentially following FIGS. 7 and 8.

FIG. 9 is a bottom plan view showing a pair of right side mounting brackets 50 and 54 in place, with a pair of mounting bungs 52 and 56 welded to the brackets 50 and 54, respectively. A pair of left side mounting brackets 60 and 64 are also shown with their bungs 62 and 64, respectively. Also shown are crossover bungs 70 and 72, and a petcock bung 74, all welded in place. Finished welds 36 and 38 for the tunnel 30 are also shown.

Figure 10:
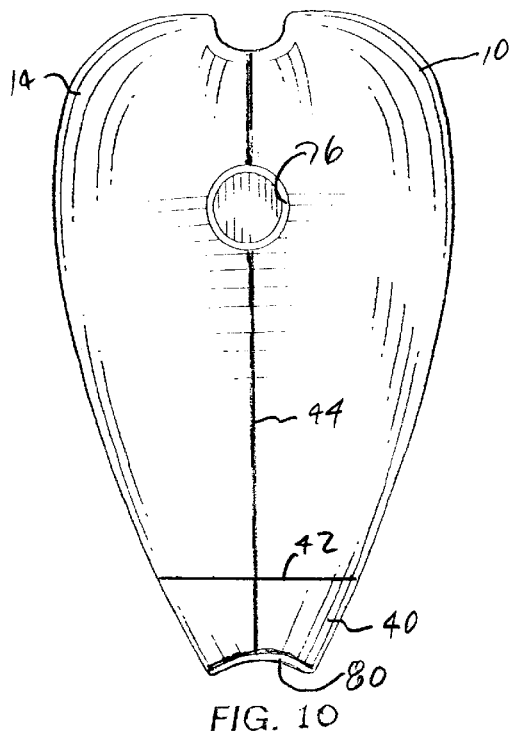
FIG. 10 is a top view sequentially following FIG. 9.

The gas tank unit is then turned over and a gas cap fitting hole 76 is drilled. The unit is then cleaned through the gas cap fitting hole. FIG. 10 shows finished welds 42 and 44 and the gas cap fitting hole 76.

Figure 11:
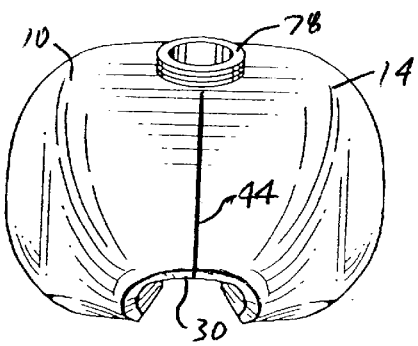
FIG. 11 is a front view sequentially following FIG. 10.

After the interior of the unit is cleaned, a gas cap fitting 78 is positioned in place in the hole, is tack welded, and then is welded in place. This is shown in FIG. 11.

A seat pocket plate 80, shown in FIG. 10, is then positioned, tack welded, and welded in place. FIG. 10 also shows finished welds 42 and 44 for the end piece 40 and the halves 10 and 14.

All of the welds are then ground down as desired and the finished unit is pressure tested. If the pressure test is successful, the gas tank is considered finished and is then ready for shipment, painting, and installation on a motorcycle.

Figure 12:
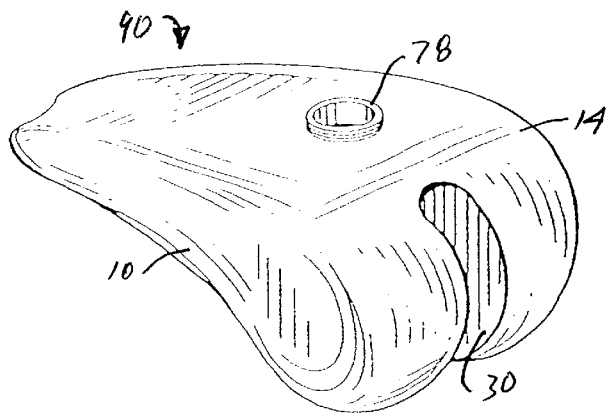
FIG. 12 is a perspective view sequentially following FIG. 11 of the completed tank.
Figure 13:
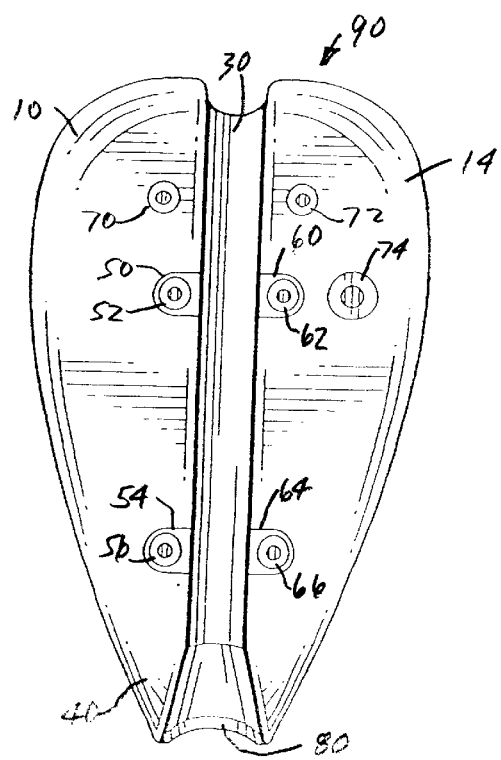
FIG. 13 is a bottom view of the completed tank.

FIG. 12 is a perspective front view of finished tank 90, with the welds ground down, and FIG. 13 is a bottom plan view of the finished tank 90.

In making a double tank unit, that is, a unit that includes a gas tank in the forward portion and an oil tank in the rear portion, the same essential steps illustrated in table 1 are employed, as illustrated in FIGS. 1–13, with the additional steps illustrated in Table 2. However, the steps outlined in Table 2 are added prior to the pressure test step.

TABLE 2

| | |
|---|---|
| 27. | Repeat steps 1–26 (from Table 1) |
| 28. | Cut off oil portion |
| 29. | Clean out unit |
| 30. | Cut off side panel for recessed panel |
| 31. | Drill holes for return fittings in recessed panel |
| 32. | Position, tack weld return fittings |
| 33. | Position and tack weld recessed panel |
| 34. | Drill fitting holes and oil cap holes |
| 35. | Position and weld breather tube |
| 36. | Weld plates onto the two portions |
| 37. | Weld two portions together |
| 38. | Weld recessed panel |
| 39. | Weld fittings |
| 40. | Position, tack weld, and weld oil cap bung |
| 41. | Grind welds |
| 42. | Pressure test |

The first step in making a dual tank unit, after the steps outlined in Table 1, is to cut off the oil portion of the finished tank. The unit is then cleaned out. That is, both the front portion and the rear portion are cleaned out. A side panel is then cut off the rear or oil portion to provide for a recessed panel.

Holes are drilled in the recessed panel for return oil fittings and the return oil fittings are positioned and tack welded onto the recessed panel. The recessed panel is the positioned in the side of the oil tank portion and tack welded in place.

Fitting holes and an oil cap hole are then drilled in the oil tank portion. Next, a breather tube is positioned and welded in place on the inside of the oil portion.

Next, plates are welded onto the two portions. That is, a rear plate is welded onto the gas tank portion and a front plate is welded onto the oil tank portion. Next, the two portions are welded together. Note that there are two plates or panels that separate the gas tank portion from the oil tank portion.

Following the welding of the two portions together, the recessed panel is welded in place and the fittings are then welded in place in the recessed panel.

Next, the fittings and oil cap bung are welded to the oil tank portion. Then, all of the welds are ground down and a pressure test of the unit is then accomplished.

Once again, if the pressure test is satisfactory, the double tank is considered completed and is ready for shipment, painting, and installation on a motorcycle.

It will be noted, that, if desired, the fabrication of the double tank, the gasoline and oil tank, may omit step 23 of Table 1 before cutting the oil tank portion from the gas tank. If such is done, that step, positioning and welding the seat pocket plate, is then accomplished after step 14 of table 2. That is, the seat pocket plate is positioned and welded prior to grinding off the welds.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. A method of making a gas tank for a motorcycle comprising the steps of:
   hydroforming two side halves of the motorcycle gas tank;
   tack welding the two side halves together;
   cutting out a portion of the tack welded side halves for a bottom tunnel;
   forming the bottom tunnel;
   welding the formed bottom tunnel to the two side halves;
   forming a bottom rear end piece;
   welding the formed bottom rear end piece to the two side halves;
   welding the tacked side halves to form a tank;
   forming mounting brackets;
   welding the formed mounting brackets to the welded tank;
   drilling holes in the mounting brackets;
   drilling crossover holes and petcock holes;
   placing tapped mounting bungs, crossover bungs, and petcock bungs in the respective drilled holes;
   welding the mounting bungs, crossover bungs, and petcock bungs in their respective holes;
   drill a gas cap fitting hole;
   positioning a gas cap fitting in the gas cap fitting hole;
   welding a gas cap fitting in the gas cap fitting hole;
   positioning a seat pocket plate on the gas tank;
   welding the seat pocket plate to the gas tank;
   cutting off an oil portion to divide the tank into two portions;
   welding plates onto the two portions;
   drilling an oil cap hole;
   welding the two portions together; and
   welding an oil cap bung to the oil cap hole.

2. The method of claim 1 which includes the further steps after cutting off the oil portion of:
   cutting off a side panel for recessed panel;
   drilling holes for return fittings in the recessed panel;
   positioning return fittings in the drilled holes;
   welding the return fittings in the drilled holes; and
   tack welding the recessed panel.

3. The method of claim 2 which includes the further steps of:
   drilling fitting holes; and
   positioning and welding a breather tube.

4. The method of claim 3 which includes the further steps of:
   welding the recessed panel, and
   welding fittings in the drilled fitting holes after the two portions have been welded together.

5. A method of making a gas tank for a motorcycle comprising the steps of:
   stamping two side halves of the motorcycle gas tank;
   tack welding the two side halves together;
   cutting out a portion of the tack welded side halves for a bottom tunnel;
   forming the bottom tunnel
   welding the formed bottom tunnel to the two side halves;
   forming a bottom rear end piece;
   welding the formed bottom rear end piece to the two side halves;
   welding the tacked side halves to form a tank;
   forming mounting brackets;
   welding the formed mounting brackets to the welded tank;
   drilling holes in the mounting brackets;
   drilling crossover holes and petcock holes;
   placing tapped mounting bungs, crossover bungs, and petcock bungs in the respective drilled holes;
   welding the mounting bungs, crossover bungs, and petcock bungs in their respective holes,
   drill a gas cap fitting hole;
   positioning a gas cap fitting in the gas cap fitting hole;
   welding a gas cap fitting in the gas cap fitting hole;
   positioning a seat pocket plate on the gas tank;
   welding the seat pocket plate to the gas tank;
   cutting off an oil portion to divide the tank into two portions;
   welding plates onto the two portions;
   drilling an oil cap hole;
   welding the two portions together; and
   welding an oil cap bung to the oil cap hole.

* * * * *